US009584042B2

(12) United States Patent
Busatto et al.

(10) Patent No.: US 9,584,042 B2
(45) Date of Patent: Feb. 28, 2017

(54) METHOD FOR DRIVING INVERTERS, AND INVERTER ADAPTED TO REDUCE SWITCHING LOSSES

(71) Applicant: ANSALDOBREDA S.p.A., Naples (IT)

(72) Inventors: Giovanni Busatto, Naples (IT); Luigi Fratelli, Naples (IT); Francesco Iannuzzo, Naples (IT); Carmine Abbate, Naples (IT)

(73) Assignee: Ansaldobreda S.p.A., Naples (IT)

( * ) Notice: Subject to any disclaimer, the term of this patent is extended or adjusted under 35 U.S.C. 154(b) by 0 days.

(21) Appl. No.: 14/652,434

(22) PCT Filed: Dec. 20, 2013

(86) PCT No.: PCT/IB2013/061221
§ 371 (c)(1),
(2) Date: Jun. 15, 2015

(87) PCT Pub. No.: WO2014/097261
PCT Pub. Date: Jun. 26, 2014

(65) Prior Publication Data
US 2015/0318792 A1    Nov. 5, 2015

(30) Foreign Application Priority Data

Dec. 20, 2012    (IT) .............................. TO2012A1112

(51) Int. Cl.
*H02M 7/5387* (2007.01)
*H02M 7/44* (2006.01)
(Continued)

(52) U.S. Cl.
CPC .............. *H02M 7/44* (2013.01); *H02M 1/00* (2013.01); *H02M 7/4807* (2013.01);
(Continued)

(58) Field of Classification Search
CPC .... H02M 2001/007; H02M 7/42; H02M 7/44; H02M 7/53; H02M 7/537; H02M 7/5387
See application file for complete search history.

(56) References Cited

U.S. PATENT DOCUMENTS 6,330,170 B1 * 12/2001 Wang ...................... H02J 9/062
                                                            363/17
6,370,050 B1    4/2002 Peng et al.
(Continued)

OTHER PUBLICATIONS

International Search Report and Written Opinion dated Sep. 29, 2014 from International Patent Application No. PCT/IB2013/061221 filed Dec. 20, 2013.
(Continued)

*Primary Examiner* — Gary L Laxton
(74) *Attorney, Agent, or Firm* — Sunstone IP

(57) ABSTRACT

A method for controlling the switching of an inverter, a bridge of which is adapted to chop a voltage from a direct voltage source for feeding a chopped voltage to a primary of a transformer; the inverter comprises a diode rectifier circuit receiving the input voltage from the secondary of the transformer in order to achieve a voltage fed to a chopper which feeds a load. The method comprises: a step in which the switches of the bridge are driven so that the power source is disconnected from the primary, the terminals of which are connected to each other by at least two of the electronic switches and recirculation diodes of the bridge itself, so that the voltage present on the secondary of said transformer is null; a step in which the switching of at least one electronic switch of a chopper branch is achieved when the voltage on the secondary is substantially null in order to minimize switching losses due to the opening/closing of the electronic switch of the chopper.

6 Claims, 5 Drawing Sheets

(51) Int. Cl.
*H02M 1/00* (2006.01)
*H02M 7/48* (2007.01)

(52) U.S. Cl.
CPC .... *H02M 7/4826* (2013.01); *H02M 2001/007* (2013.01); *H02M 2001/0048* (2013.01); *H02M 2001/0058* (2013.01); *Y02B 70/1491* (2013.01)

(56) References Cited

U.S. PATENT DOCUMENTS

| | | | | |
|---|---|---|---|---|
| 7,672,149 | B2* | 3/2010 | Falk | H02J 3/387 363/21.02 |
| 8,891,253 | B2* | 11/2014 | Knill | H02J 3/32 363/17 |
| 9,077,262 | B2* | 7/2015 | Melanson | H02M 1/14 |
| 2005/0099829 | A1 | 5/2005 | Wei et al. | |
| 2005/0180175 | A1 | 8/2005 | Torrey et al. | |

OTHER PUBLICATIONS

International Preliminary Report on Patentability dated Mar. 20, 2015 from International Patent Application No. PCT/IB2013/061221 filed Dec. 20, 2013.

* cited by examiner

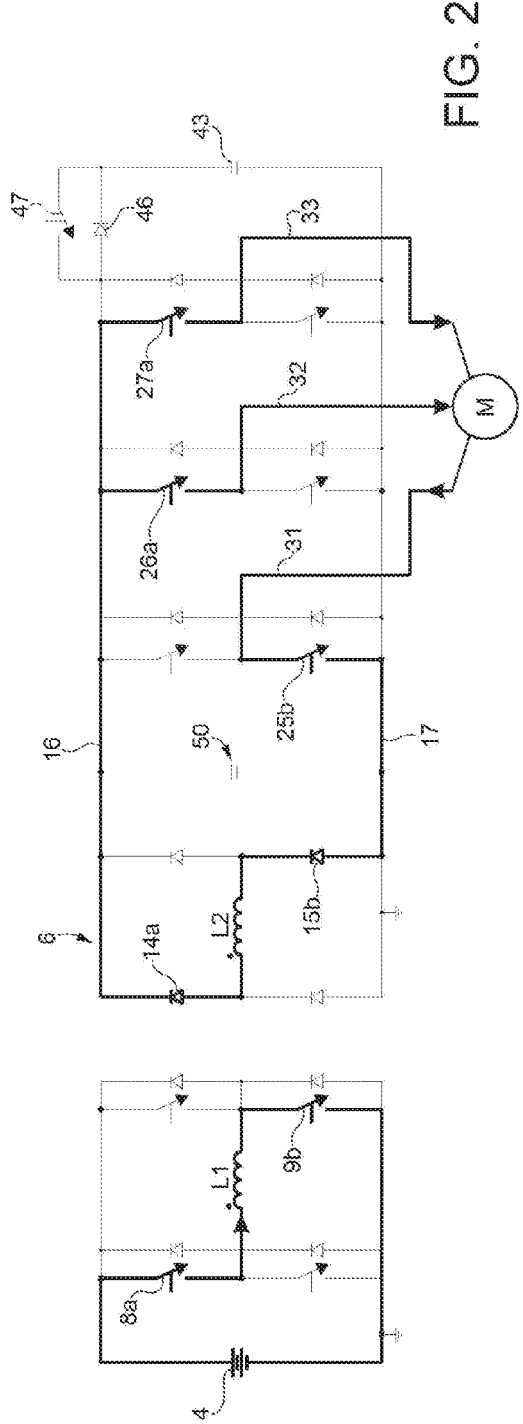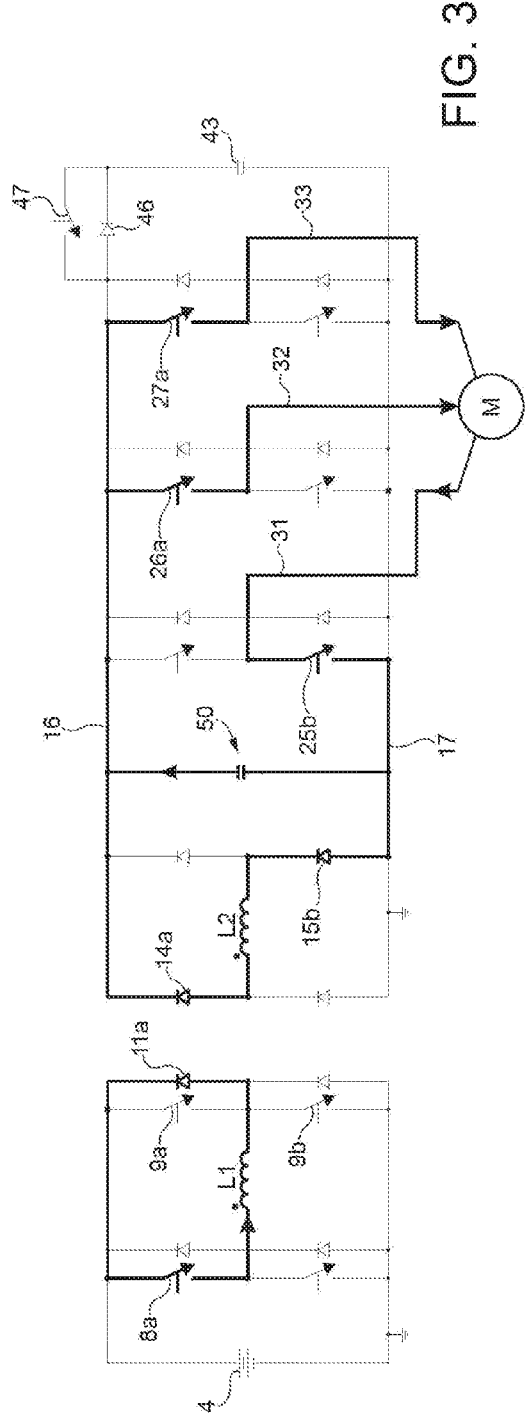

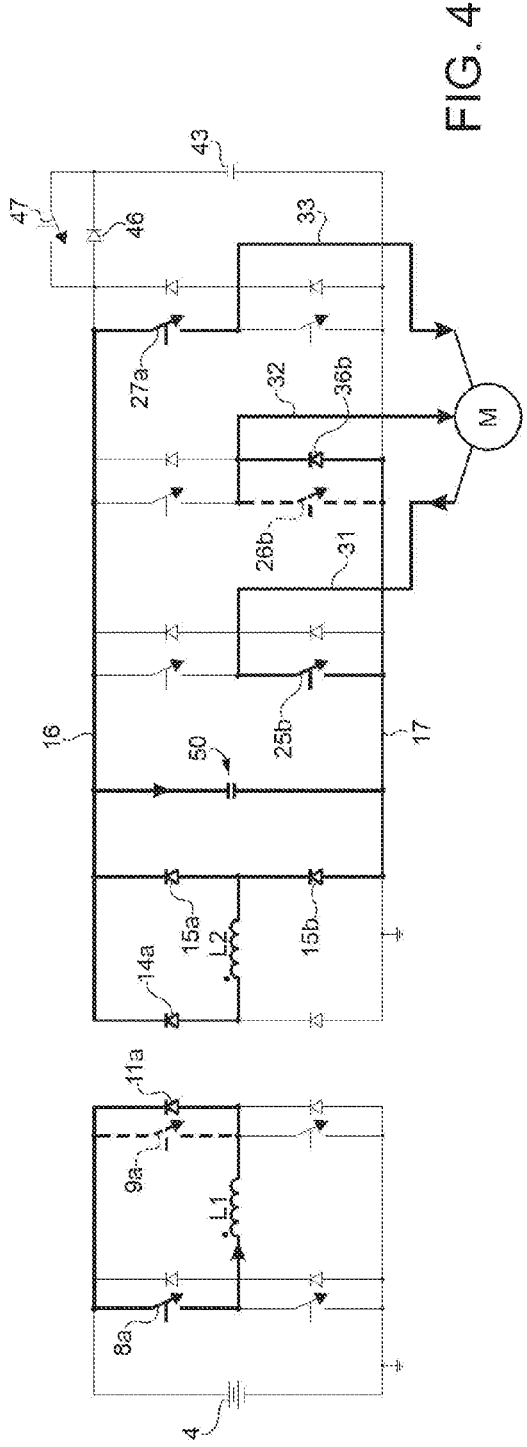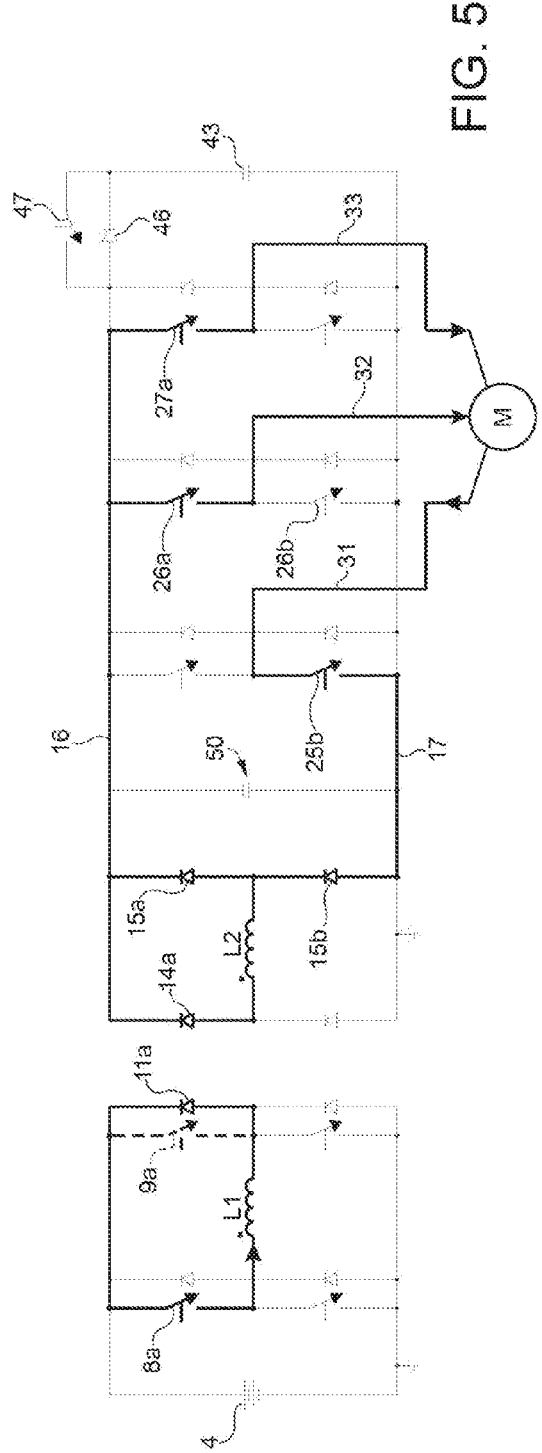

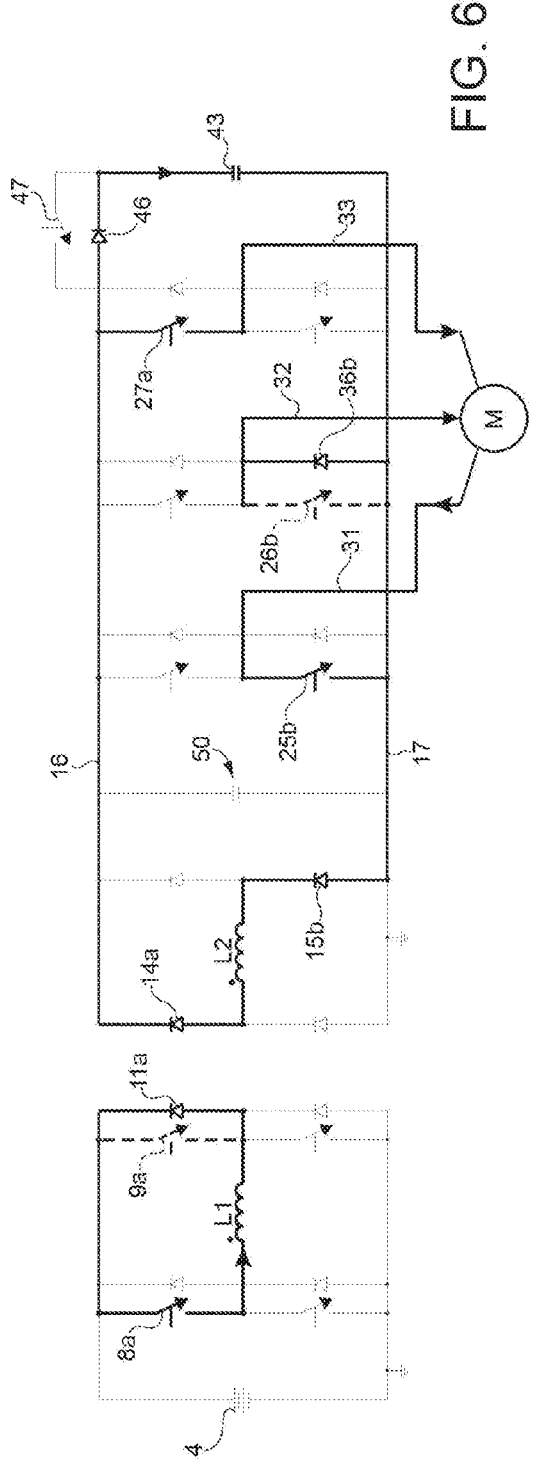
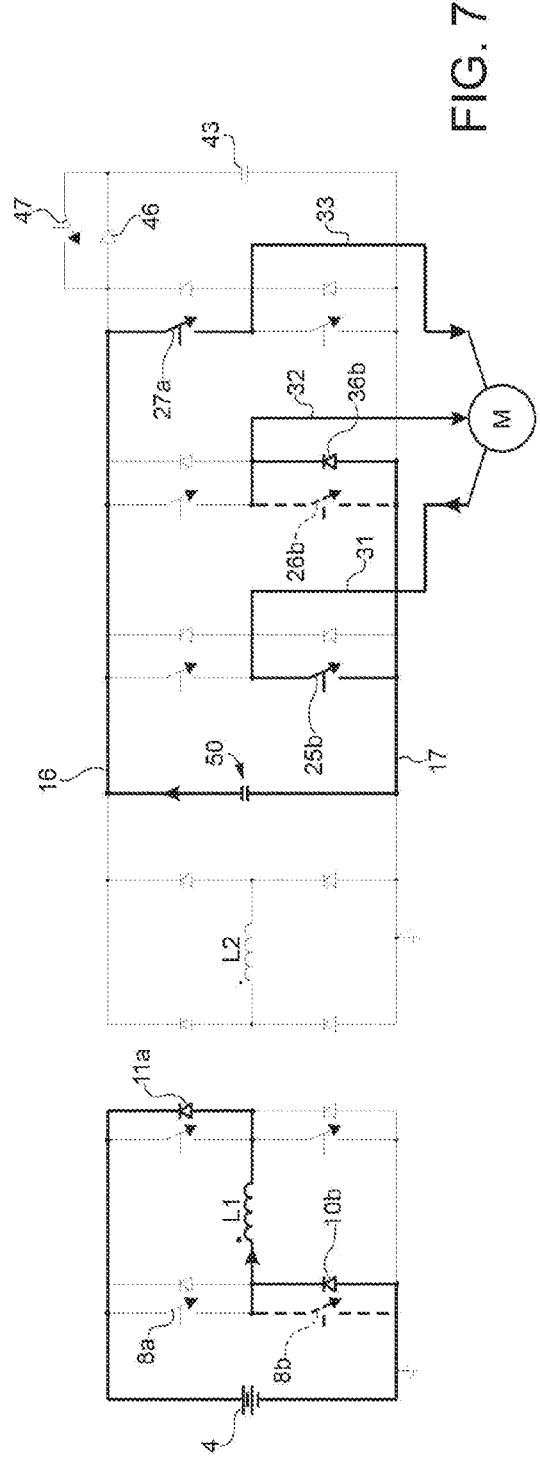

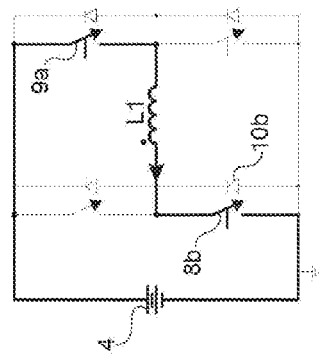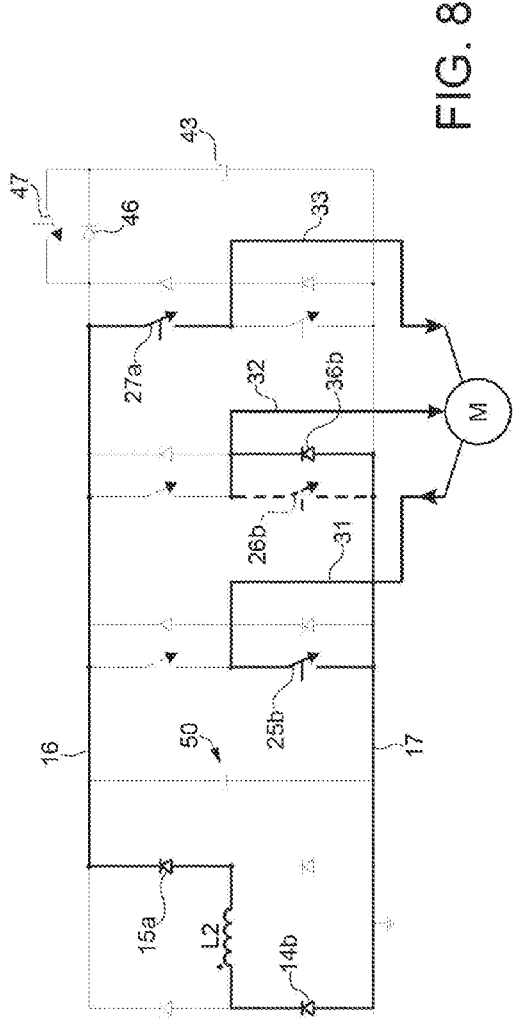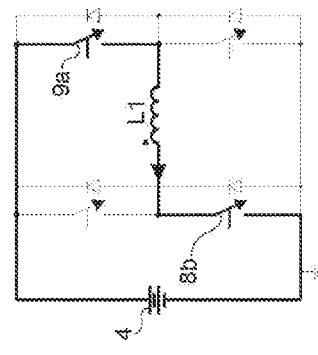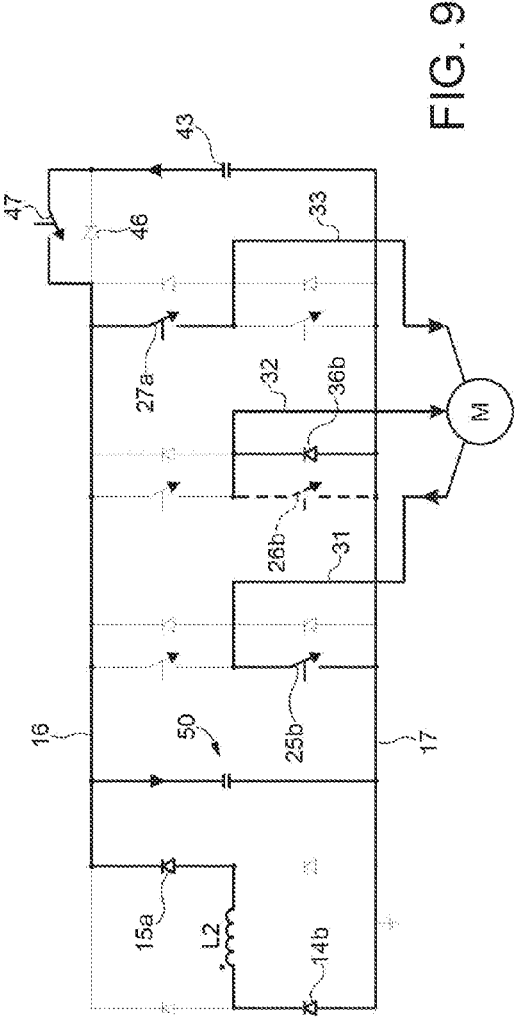
FIG. 8
FIG. 9

METHOD FOR DRIVING INVERTERS, AND INVERTER ADAPTED TO REDUCE SWITCHING LOSSES

TECHNICAL FIELD

The present invention relates to a method for driving inverters and to an inverter adapted to reduce switching losses.

BACKGROUND ART

Inverters are known in which a bridge (e.g. an H bridge) is adapted to chop a voltage from a direct voltage source for feeding an alternating voltage to a primary of a transformer; the inverter further comprises a diode rectifier-leveler circuit receiving the input alternating voltage from the secondary of the transformer in order to achieve a leveled voltage fed to a chopper which in turn feeds a load. The chopper generally includes a plurality of parallel branches (different chopper structures with two, three or more stages are possible), each of which consists of a pair of electronic semiconductor switches arranged in series and interposed between a positive power supply line and a negative power supply line from the rectifier-leveler circuit. The common terminals of the electronic switches of the chopper communicate with load power supply lines; each electronic switch of the chopper is also provided with a recirculation diode arranged in parallel.

The switching of the electronic switches of the chopper is controlled by an electronic unit which operates a certain load feeding program (for example, if such a load is an electric motor, the rotation speed of the motor and the power delivered by the motor itself can be set and adjusted).

Known electronic units control the switching of the chopper switches, under many operating conditions, in the presence of voltage at the ends of the switches themselves; such an operation—as known from the physics Of semiconductors—results in a power dissipation that contributes to a considerable part of switching losses.

DISCLOSURE OF INVENTION

It is the object of the present invention to provide a method for controlling an inverter and an inverter in which such switching losses are minimized.

The above object is achieved by the present invention as it relates to a method of controlling the switching of an inverter, where a bridge is adapted to chop a voltage from a direct voltage source for feeding a chopped voltage to a primary of a transformer; the inverter comprising a diode rectifier circuit receiving the input voltage from the secondary of the transformer in order to achieve a voltage fed to a chopper which feeds a load; said bridge comprising at least a first branch and a second branch, each consisting of a pair of electronic switches arranged in series; the common terminals of the electronic switches are connected to the terminals of said primary; each electronic switch being provided with a recirculation diode arranged in parallel, the method being characterized in that it comprises the execution of: a step in which the switches of said bridge are driven so that the power supply source is disconnected from said primary, the terminals of which are reciprocally, connected by at least two of said electronic switches and said recirculation diodes, so that the voltage present on the secondary of said transformer is null; switching at least one electronic switch of a branch of said chopper when the voltage on the secondary is substantially null in order to minimize the switching losses due to the opening/closing of said electronic switch of said chopper.

In particular, a capacitor having a first terminal is connected to a first line from the rectifier and a second terminal is connected to a second line from the rectifier through a diode which allows the capacitor to be charged with the current from load M under low power factor conditions, thus preventing the overvoltage on the first and second lines; said method comprising the step of closing a switch arranged in parallel to the diode thus discharging the capacitor towards the load in order to recover the stored energy, thus increasing the circuit efficiency.

Moreover, a snubber capacitor is provided, a first terminal of which is connected to a first line from the rectifier and a second terminal is connected to a second line from the rectifier, which allows all the switches of said chopper to be switched to zero voltage even in the presence of negative current towards the load.

BRIEF DESCRIPTION OF THE DRAWINGS

The invention will now be disclosed with reference to the accompanying drawings which show a preferred embodiment thereof, in which:

FIGS. 2-9 show consecutive steps operated by the method.

BEST MODE FOR CARRYING OUT THE INVENTION

Figure 1:
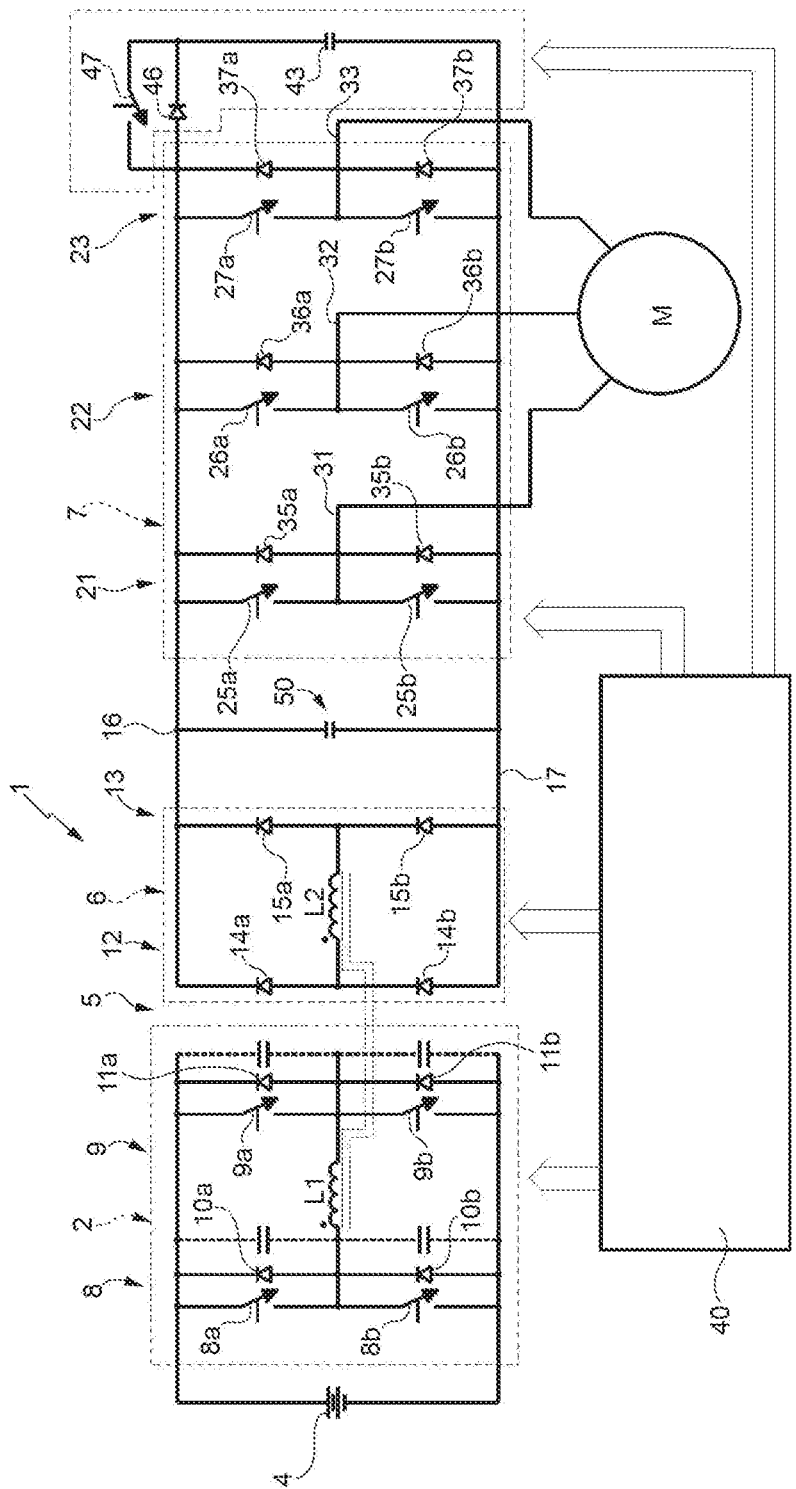
FIG. 1 shows an inverter operating according to the method of the present invention.

In FIG. 1, reference numeral 1 indicates as a whole an inverter 1 according to the present invention to which a driving method according to the present invention is applied.

In particular, inverter 1 includes an H bridge 2 which is adapted to chop a voltage from a direct voltage source 4 (e.g. V=1500 Volts) for feeding a chopped voltage to a primary Li of a transformer 5. Inverter 1 further comprises a diode rectifier circuit 6 receiving the input alternating voltage from the secondary L2 of transformer 5 in order to achieve a voltage fed to a three-phase chopper 7 which, in the example, feeds a three-phase load M, such as an electric motor.

In greater detail, the H bridge 2 includes a first branch 8 and a second branch 9, each consisting of a pair of electronic switches 8A, 8B and 9A, 9B (such as MOS) arranged in series. The common terminals of the electronic switches 8A, 8B and 9A, 9B are connected to the terminals of primary L1, whereas the opposite sides of branches 8 and 9 are connected to the positive/negative terminal of the direct voltage source 4.

Each electronic switch 8A, 8B and 9A, 9B is provided with a recirculation diode 10A, 10B and 11A, 11B arranged in parallel and operating in a known manner.

The rectifier circuit 6 comprises a first branch 12 and a second branch 13, each consisting of a pair of diodes 14A, 14B and 15A, 15B arranged in series. The common terminals of diodes 14A, 14B and 15A, 15B are connected to the terminals of secondary L2, whereas the opposite sides of branches 12 and 13 are connected to a positive supply line 16 and to a negative supply line 17, respectively.

A snubber capacitor 50 is arranged between lines 16 and 17.

The three-phase chopper 7 includes a first, a second and a third branch 21, 22 and 23 interposed between lines 16 and 17.

Each branch 21, 22 and 23 comprises a pair of electronic switches 25A, 25B-26A, 26B-27A, 27B (such as MOS) arranged in series; a first, a second and a third line 31, 32 and 33 for feeding load M branch off the common terminals of switches 25A, 25B-26A, 26B-27A, 27B.

The three-phase chopper 7 comprises, for each switch 25A, 25B-26A, 26B-27A, 27B, a respective recirculation diode 35A, 35B-36A, 36B-37A, 37B arranged in parallel and operating in a known manner.

The switching of switches 8A, 8B and 9A, 9B of the H bridge 2 and of switches 25A, 25B-26A, 26B, 27A-27B is controlled by a control unit 40 which operates according to the method of the present invention.

A capacitor 43 with large capacity has a first terminal connected to a first line (the negative line 17 in the example) and a second terminal connected to a second line (the positive line 16) through a clamp diode which allows capacitor 43 to be charged with the current from load M if it is of the inductive type (such a case will be exemplified hereafter).

An electronic switch 47 (such as a MOS) is arranged in parallel to diode 46; closing such a switch 47 allows capacitor 43 to be discharged towards load M in order to efficiently recover the previously stored energy. The operations of the method of the present invention will be exemplified with the aid of FIGS. 2-9, which show a possible sequence of switching operations according to the present method.

STEP 1 (FIG. 2). Switches 8A and 9B are closed. (switches 8B and 9A are kept open) and voltage V of source 4 is applied to the primary winding L1.

A voltage kV (where k is the transformation ratio of transformer 5) is induced on the secondary winding L2, which voltage kV is rectified by circuit 6 where diodes 14A and 15B conduct. The voltage present on lines 16 and 17 is applied to motor M by means of switches 25B, 26A and 27A that are closed (the other switches are open). The closed/open switches may obviously be other than those shown; this is a simplification.

STEP 2 (FIG. 3). Switch 8A is kept closed and switch 9B is open (switches 8B and 9A are kept open); for continuity of the current in winding L1, the current in primary L1 closes in the mesh formed by switch 8A and recirculation diode 11A which conducts. The voltage on the secondary of transformer L2 thus goes to zero and so does the voltage present between lines 16 and 17. The snubber capacitor 50 discharges on the load through lines 16 and 17 and switches 25B, 26A and 27A. The arrangement of the switches of the three-phase chopper 7 is kept equal to that in STEP 1.

STEP 3 (FIG. 4). The operation of closing switch 9A is started (such an operation is indicated by the dotted line); switch 9A is closed with voltage equal to zero, as the recirculation diode 11A conducts. The voltage of lines 16 and 17 is annulled through diodes 15A and 15B. The arrangement of the switches of the three-phase chopper 7 is kept equal to that in STEP 1.

STEP 4 (FIG. 5). The arrangement of the H bridge 2 remains unchanged; according to the present invention, a switching of at least one branch of the three-phase chopper is controlled (in the example, the previously closed switch 26A is opening-controlled and the previously opened switch 26B is closing-controlled; other switching operations are obviously possible), when the voltage between lines 16 and 17 is close to zero because, on the H bridge, the direct voltage of source 4 is not applied to the primary of transformer 5, the ends of which are connected to each other by two components (in the example, switch 8A and recirculation diode 11A or switch 9A) of bridge 2. If the current in line 32 is positive towards the load, diode 36B conducts, thus allowing switch 26B to be started while voltage is zero. If the current in line 32 in the example is negative towards the load, the snubber capacitor 50 allows the zeroing of the current in switch 26B while the voltage on lines 16 and 17 is still low. The switching of the branch thus occurs, in any case, when the voltage is zero or almost zero, and therefore with very few losses.

STEP 5 (FIG. 6). Upon the previous pattern change described in STEP 4, the voltage on line 16 could increase up to directly polarize the clamp diode 46 due to the leaked inductance, and based on the initial current in winding L2. In this case, the excess charge is absorbed by capacitor 43 (with a high capacity value) which limits the voltage between lines 16 and 17. In particular, the voltage at the ends of capacitor 43 is adjusted and kept constant at the peak value of the output sine curves.

In this case, as will be resumed later, the excess charge stored in capacitor 43 is recovered by closing switch 47 and arranging capacitor 43 between lines 16 and 17; thereby, in the next cycle, the energy of capacitor 43 will again be returned to load M, thus obtaining a high energy efficiency.

STEP 6 (FIG. 7). Switch 8A is opened and switch 8B of the H bridge 2 is closed in order to reverse the direction of the current flowing in the primary winding L1.

STEP 7 (FIG. 8). First, given the previous magnetization of primary L1, the current flows in diodes 10B and 11A. However, as L1 is thus subjected to a voltage in the opposite direction with respect to the initial current, it demagnetizes and the current flowing therethrough is reversed in direction with respect to that taken during STEP 1, through switches 9A and 8B; consequently, the voltage at the ends of secondary L2 is also reversed with respect to that present in STEP 1. The cycle described is repeated starting from a step similar to that of STEP 1 and symmetric according to the configuration of the switches of the H bridge 2. In the next cycle repetition, the switching of one of the switches of branches 21, 22 and 23 will be operated when the voltage between lines 16 and 17 is equal to zero, as the terminals of the primary close by means of switch 8B and diode 11B (or switch 9B).

The above-described method thus allows the switching losses of the whole converter 1 to be significantly reduced. In fact, compared to a traditional topology, the so-called hard switching, the switching of chopper 5 takes place; for all the switches thereof, without losses, because they switch to ZV (null voltage). The same applies to the switches of the H bridge 2, which is driven with a phase shift technique (of the known type), which allows per se the switching to ZV (null voltage).

The description of STEP 4 in FIG. 4 relates to a load M which is merely resistive in nature. In contrast, in the presence of an inductive load M, and for example having a power factor lower than 0.866, during STEP 4 there would at times be a power flow along lines 31, 32 and 33 from load M towards converter 1; such a phenomenon would produce an induced overvoltage on lines 16 and 17. Accordingly, the switching of the branch at STEP 4 would occur with a voltage potentially higher than the nominal one, thus resulting in the possible breakup of the chopper switches. Such a drawback is solved with the presence of diode 46 which, in STEP 4, together with the high value capacitor 43, limits the voltage between lines 16 and 17. The discharge of capacitor 43 towards load M takes place at the next step, with the closing of switch 47 (FIG. 9).

The invention claimed is:

1. A method for controlling switching of an inverter, wherein a bridge is adapted to chop a voltage from a direct voltage source for feeding a chopped voltage to a primary of a transformer; the inverter comprising a diode rectifier circuit receiving an input voltage from a secondary of the transformer in order to achieve a voltage fed to a chopper which feeds a load;

said bridge comprising at least a first branch and a second branch, each being formed by a pair of electronic switches arranged in series with each other; wherein common terminals of the pair of electronic switches are connected to terminals of said primary; each electronic switch being provided with a recirculation diode arranged in parallel, the method being characterized so as to comprise the execution of:

a step in which the switches of said bridge are driven such that a power supply source is disconnected from said primary and the terminals of said primary are reciprocally connected by at least two of said pair of electronic switches provided with said recirculation diodes such that a voltage present on the secondary of said transformer is null; and switching at least one electronic switch of at least one of said first branch or said second branch of said chopper when the voltage on the secondary is substantially null, wherein switching during the period when the voltage on the secondary is substantially null minimizes losses, because, when the voltage on the secondary is substantially null, said voltage on the secondary is not then applied to the primary, since the primary has terminals that are short-circuit connected one with the other by the connection of at least one of the at least two of said pair of electronic switches provided with said recirculation diodes of the first or second branch of the bridge.

2. The method according to claim 1, wherein a capacitor having a first terminal is connected to a first line from the rectifier circuit and a second terminal is connected to a second line from the rectifier circuit through a damp diode which allows the capacitor to be charged with a current from load in low power factor conditions, thus preventing an overvoltage on the first and second lines; said method comprising a step of closing an additional switch arranged in parallel to the clamp diode by discharging the capacitor towards the load in order to recover stored energy, thus increasing circuit efficiency.

3. The method according to claim 2, wherein said additional switch is closed once at least one electronic switch of at least the first branch or the second branch of said chopper has been closed, which modifies a previous pattern of the chopper itself in order to arrange said capacitor between feeding lines of said chopper, thus preventing a voltage variation due to an inductive effect due to the modified previous pattern.

4. An inverter, a bridge of which is configured to chop a direct voltage from a source for feeding a chopped voltage to a primary of a transformer, the inverter comprising:

a diode rectifier circuit configured to receive an input voltage from a secondary of the transformer in order to achieve a voltage fed to a chopper which feeds a load; and said bridge comprising:

at least a first branch and a second branch, each one of the first branch and the second branch including a pair of electronic switches arranged in series with each other;

wherein common terminals of the electronic switches of the first branch and the second branch are connected to terminals of said primary; each electronic switch being provided with a recirculation diode arranged in parallel;

the inverter being further characterized in that the inverter comprises electronic control means of said bridge and of said chopper, the electronic control means configured to drive the switches of said bridge in a step in which a power supply source is disconnected from said primary, wherein terminals of the primary are reciprocally connected by at least two of said electronic switches and said recirculation diodes such that a voltage present on the secondary of said transformer is null; and wherein said electronic control means are configured to switch at least one electronic switch of at least one branch of said chopper for feeding said load when the voltage on the secondary is substantially null because said voltage is not applied to the primary, since the terminals of the primary are short-circuit connected with each other by the connection of at least one of the electronic switches provided with the recirculation diodes of the first branch or the second branch, in order to minimize switching losses due to opening or closing of said at least one electronic switch of said chopper.

5. The inverter according to claim 4, wherein a capacitor is included, which capacitor has a first terminal connected to a first line from the rectifier circuit and a second terminal connected to a second line from the rectifier circuit through a clamp diode which allows the capacitor to be charged with a current from a load in low power factor conditions, thus preventing an overvoltage on the first and second lines; said electronic control means being configured to close an additional switch arranged in parallel to the clamp diode by discharging the capacitor towards the load in order to recover stored energy, thus increasing circuit efficiency.

6. The inverter according to claim 4, wherein a snubber capacitor is included, which snubber capacitor has a first terminal connected to a first line from the rectifier circuit and a second terminal connected to a second line from the rectifier circuit which allows the electronic switches of the chopper to be switched to zero voltage even when there is a negative current towards the load.

\* \* \* \* \*